US008082176B2

(12) United States Patent
Kaneko

(10) Patent No.: US 8,082,176 B2

(45) Date of Patent: *Dec. 20, 2011

(54) MESSAGE CHARACTER STRING OUTPUT SYSTEM, ITS CONTROL METHOD, AND INFORMATION STORAGE MEDIUM

(75) Inventor: Motoki Kaneko, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 866 days.

This patent is subject to a terminal disclaimer.

(21) Appl. No.: 11/887,107

(22) PCT Filed: Feb. 16, 2006

(86) PCT No.: PCT/JP2006/302737

§ 371 (c)(1), (2), (4) Date: Sep. 25, 2007

(87) PCT Pub. No.: WO2006/103840

PCT Pub. Date: Oct. 5, 2006

(65) Prior Publication Data

US 2009/0228556 A1 Sep. 10, 2009

(30) Foreign Application Priority Data

Mar. 25, 2005 (JP) ................................ 2005-089881

(51) Int. Cl.
*G06Q 30/00* (2006.01)

(52) U.S. Cl. ....................... 705/14.49; 705/14.5; 463/42

(58) Field of Classification Search ............... 705/14.49, 705/14.5; 463/42
See application file for complete search history.

(56) References Cited

U.S. PATENT DOCUMENTS 5,643,088 A * 7/1997 Vaughn et al. .................. 463/40
5,941,772 A * 8/1999 Paige .............................. 463/20
5,946,664 A * 8/1999 Ebisawa ....................... 705/14.5
6,540,609 B1 * 4/2003 Paige ............................. 463/20
6,616,533 B1 * 9/2003 Rashkovskiy .................. 463/31
6,625,578 B2 * 9/2003 Spaur et al. .................. 705/14.5
(Continued)

FOREIGN PATENT DOCUMENTS

JP 2003-85433 A 3/2003
JP 3424822 B2 6/2003
(Continued)

OTHER PUBLICATIONS

Office Action dated Feb. 20, 2009.

(Continued)

*Primary Examiner* — Jagdish Patel
*Assistant Examiner* — Sara Chandler
(74) *Attorney, Agent, or Firm* — Sughrue Mion, PLLC

(57) ABSTRACT

A message string output system which allows increased input motivation of a user with respect to a specific string is provided. A point information storage (48) stores point information in correspondence with user identification information. A specific string storage (44) stores a specific string. A user identification information acquiring unit (34) acquires user identification information corresponding to a message string which is input by an input unit (30). A judging unit (36) judges whether or not the message string which is input by the input unit (30) contains the specific string stored in the specific string storage (44). A point information updating unit (40) updates, based on a judgment result by the judging unit (36), point information stored in the point information storage (48) in correspondence with the user identification information acquired by the user identification information acquiring unit (34).

10 Claims, 4 Drawing Sheets

U.S. PATENT DOCUMENTS

| | | | | |
|---|---|---|---|---|
| 6,712,702 | B2 * | 3/2004 | Goldberg et al. | 463/42 |
| 6,790,142 | B2 * | 9/2004 | Okada et al. | 463/42 |
| 6,890,256 | B2 * | 5/2005 | Walker et al. | 463/20 |
| 6,928,414 | B1 * | 8/2005 | Kim | 705/14.5 |
| 7,485,040 | B2 * | 2/2009 | Walker et al. | 463/20 |
| 7,729,946 | B2 * | 6/2010 | Chu | 705/26 |
| 2002/0013174 | A1 * | 1/2002 | Murata | 463/42 |
| 2002/0046102 | A1 * | 4/2002 | Dohring et al. | 705/14 |
| 2003/0105669 | A1 | 6/2003 | Tsuchiya | |
| 2003/0195801 | A1 * | 10/2003 | Takakura et al. | 705/14 |
| 2003/0216961 | A1 * | 11/2003 | Barry | 705/14 |
| 2004/0162144 | A1 * | 8/2004 | Loose et al. | 463/42 |
| 2005/0119936 | A1 * | 6/2005 | Buchanan et al. | 705/14 |
| 2005/0216346 | A1 * | 9/2005 | Kusumoto et al. | 705/14 |

FOREIGN PATENT DOCUMENTS

| | | | |
|---|---|---|---|
| JP | 2003-223401 | A | 8/2003 |
| JP | 2003-242397 | A | 8/2003 |

OTHER PUBLICATIONS

Kenji Tateishi et al., Internet kara no Hyoban Joho Kensaku(Opinion Information Retrieval from the Internet), Information Processing Society of Japan Kenkyu Hokoku, Jul. 17, 2001, p. 75-82, vol. 2001, No. 69.

Makoto Sano, "Kansei Hinshitsu Hyokago Jisho o Riyo Shita Text Mining", Database to Web Joho System ni Kansuru Symposium Ronbunshu, Information Processing Society of Japan Symposium Series, Nov. 26-27, 2003, p. 219-226, vol. 2003, No. 18.

* cited by examiner

| USER ID | POINT AMOUNT OUTSTANDING |
|---|---|
| U001 | 10 |
| U002 | 30 |
| U003 | 25 |

| SPECIFIC STRING ID | SPECIFIC STRING | BASE POINT AMOUNT |
|---|---|---|
| S001 | ○○○ | 1 |
| S002 | △△△ | 3 |
| S003 | □□□ | 5 |

FIG.6

| USER ID | SPECIFIC STRING ID |
|---|---|
| U001 | S001, S003 |
| U002 | S001 |
| U003 | S002 |

FIG.7

| POSITION | POINT PROVISION COEFFICIENT |
|---|---|
| FIRST – TENTH CHARACTERS | 2.0 |
| ELEVENTH – THIRTIETH CHARACTERS | 1.0 |
| THIRTY FIRST AND LATER CHARACTERS | 0 |

FIG.8

| DATE | USER ID | SPECIFIC STRING ID | PROVIDED POINT AMOUNT |
|---|---|---|---|
| ... | U001 | S003 | 5 |
| ... | U003 | S002 | 3 |
| ... | U003 | S002 | 6 |

FIG.9

| USER ID | MESSAGE STRING |
|---|---|
| U001 | ... |
| U002 | ... |
| U003 | ... |

MESSAGE CHARACTER STRING OUTPUT SYSTEM, ITS CONTROL METHOD, AND INFORMATION STORAGE MEDIUM

TECHNICAL FIELD

The present invention relates to a message string output system, a control method of a message string output system, and an information storage medium.

BACKGROUND ART

Systems are known in which a server is connected to a communication network such as the Internet and an access from a plurality of terminals such as a home game machine and a personal computer to the server is allowed, to enable communication among users in distant locations. For example, a message string output system is known in which, when a user inputs a message string, the message string is output on another terminal so that players can enjoy chatting.

[Patent Document 1] JP3424822B

DISCLOSURE OF THE INVENTION

Problem to be Solved by the Invention

Because the message string output system as described above is used by many users, such a system can be expected to become an effective place for advertisement activities. In particular, such a system has highly expectations as a place for advertisement through word-of-mouth communication.

The present invention has been conceived in view of the above-described circumstances, and an advantage of the present invention is that a message string output system, a control method of a message string output system, and an information recording medium are provided which enable an improvement in input motivation by a user for a specific string and enable active advertisement, for example, through word-of-mouth communication.

Means for Solving the Problem

According to one aspect of the present invention, there is provided a message string output system which comprises a plurality of input means and outputs a message string which is input by the input means to at least output means corresponding to other input means among the plurality of input means, the message string output system comprising point information storage means for storing point information in correspondence with user identification information, specific string storage means for storing a specific string, user identification information acquiring means for acquiring user identification information corresponding to a message string which is input by the input means, judging means for judging whether or not the message string which is input by the input means contains the specific string stored in the specific string storage means, and point information updating means for executing, based on a judgment result by the judging means, update of point information stored in the point information storage in correspondence with the user identification information acquired by the user identification information acquisition means.

According to another aspect of the present invention, there is provided a method of controlling a message string output system which comprises a plurality of input means and outputs a message string which is input by the input means to at least output means corresponding to other input means among the plurality of input means, the control method comprising a user identification information acquiring step in which user identification information corresponding to a message string which is input by the input means is acquired, a judging step in which it is judged whether or not the message string which is input by the input means contains a specific string stored in a specific string storage means, which stores the specific string, and a point information updating step in which update of point information stored in a point information storage, which stores point information in correspondence with the user identification information, in correspondence with user identification information acquired in the user identification information acquiring step is executed based on a judgment result in the judging step.

According to another aspect of the present invention, there is provided a program for causing a computer to function as a message string output system which comprises a plurality of input means and outputs a message string which is input by the input means to at least output means corresponding to other input means among the plurality of input means, and also to function as point information storage means for storing point information in correspondence with user identification information, specific string storage means for storing a specific string, user identification information acquiring means for acquiring user identification information corresponding to a message string which is input by the input means, judging means for judging whether or not the message string which is input by the input means contains the specific string stored in the specific string storage means, and point information updating means for executing, based on a judgment result by the judging means, update of point information stored in the point information storage means in correspondence with the user identification information acquired by the user identification information acquiring means.

According to another aspect of the present invention, there is provided a computer readable information storage medium on which the above-described program is stored. According to another aspect of the present invention, there is provided a program distributing device which comprises an information storage medium storing the above-described program, and reads the program from the information storage medium and distributes the program. According to another aspect of the present invention, there is provided a program distributing method, while using an information storage medium storing the above-described program, for reading the program from the information storage medium, and distributing the program.

According to the present invention, point information is stored in correspondence with user identification information. In addition, a specific string is stored. When a message string is input, it is judged whether or not the message string contains the specific string. The point information stored in correspondence with the user identification information corresponding to the message string is updated based on the judgment result. According to the present invention, an input motivation of a user for the specific string can be improved. As a result, by setting, for example, a keyword related to advertisement as the specific string, it is possible to promote active advertisement through words-by-mouth communication.

In one example of the present invention, the specific string storage means may store one or a plurality of specific strings in correspondence with the user identification information, and the judging means may judge whether or not the message string which is input by the input means contains the specific string stored in the specific string storage means in correspondence with the user identification information acquired by the user identification information acquiring means.

In another example of the present invention, the message string output system may further comprise point change information storage means for storing point change information in correspondence with the specific string, wherein the point information updating means may execute, when the judging means judges that the message string which is input by the input means contains the specific string stored in the specific string storage means, the update based on the point change information stored in the point change information storage means in correspondence with the specific string.

In still another example of the present invention, the point change information may be determined based on a number of characters of the specific string.

In still another example of the present invention, the point change information may be determined based on types of characters included in the specific string.

In yet another example of the present invention, the judging means may comprise specific string position acquiring means for acquiring, when it is judged that the message string which is input by the input means contains the specific string stored in the specific string storage means, a position of the specific string in the message string, and the point information updating means may execute the update based on an acquisition result by the specific string position acquiring means.

BRIEF DESCRIPTION OF THE DRAWINGS

FIG. 6 is a diagram showing an example of a user specific string table.

FIG. 7 is a diagram showing an example of a point provision coefficient table.

FIG. 8 is a diagram showing an example of a point provision history table.

FIG. 9 is a diagram showing an example of a message string table.

BEST MODE FOR CARRYING OUT THE INVENTION

One example of the embodiment of the present invention will now be described with reference to the drawings. In the following description, an example configuration is described in which the present invention is applied to a network game system which is one form of a message string output system.

Figure 1:
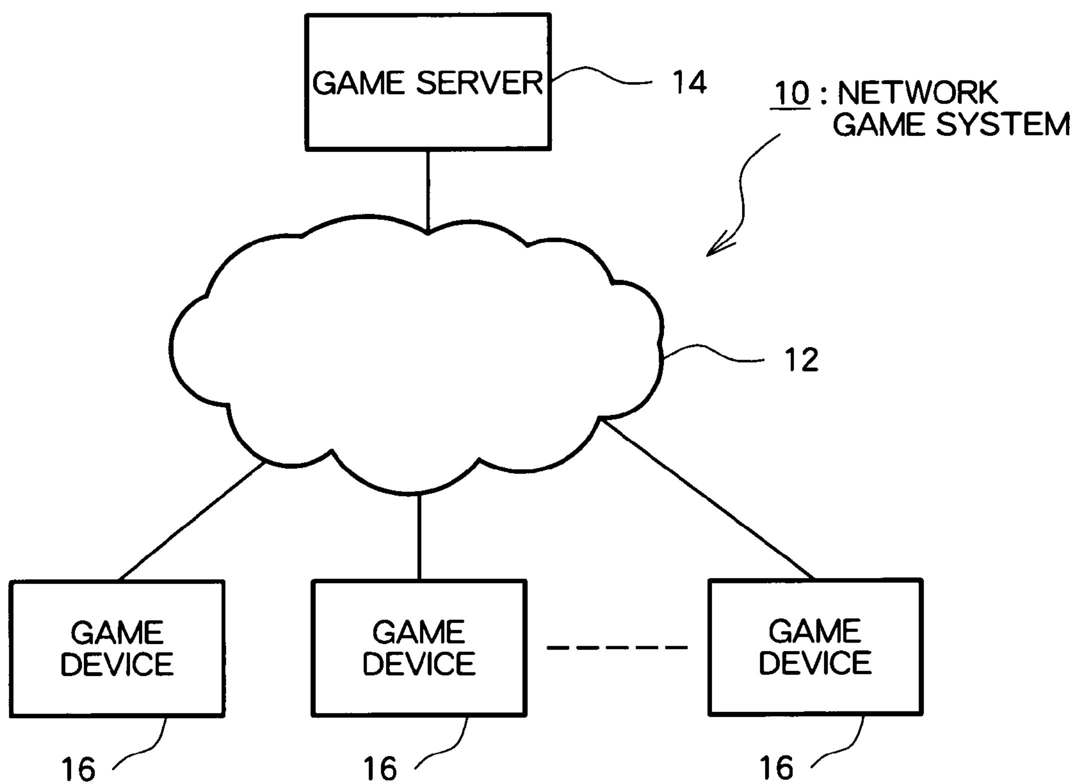
FIG. 1 is a diagram showing an overall structure of a network game system according to the embodiment of the present invention.

FIG. 1 is a diagram showing an overall structure of a network game system according to the embodiment of the present invention. As shown in FIG. 1, the network game system 10 comprises a game server 14 and a plurality of game devices (terminals) 16. The game server 14 and the game device 16 are connected to a communication network 12 such as the Internet and can transmit and receive data between each other. The game server 14 may be, for example, a computer system comprising a conventionally known server computer. The game device 16 may be, for example, a computer system comprising a conventionally known personal computer, a home game machine, a portable game machine, a personal digital assistant, or a portable phone.

Figure 2:
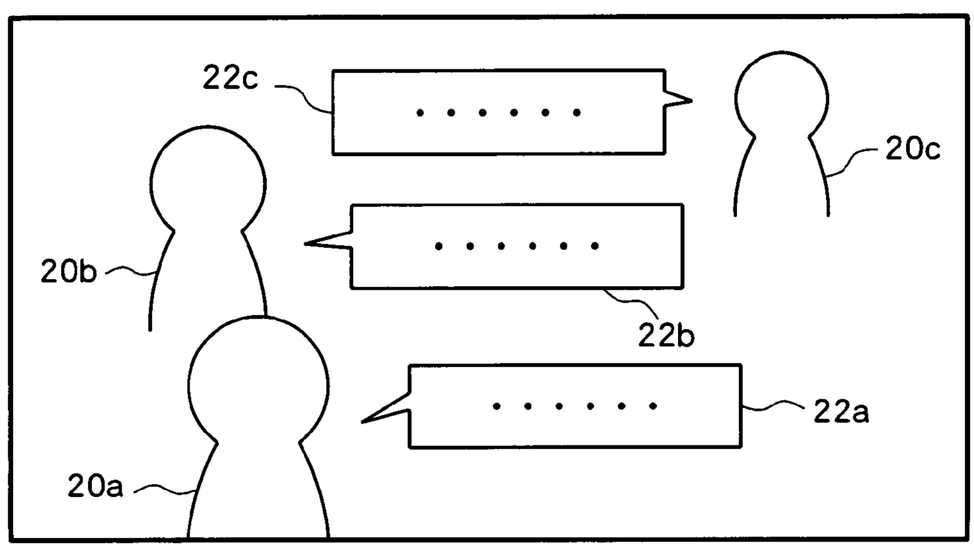
FIG. 2 is a diagram showing an example game screen.

FIG. 2 shows an example game screen displayed on each game device 16. As shown in FIG. 2, game characters 20*a*, 20*b*, and 20*c* are displayed on the game screen. More specifically, a game character (for example, the game character 20*a*) corresponding to the game device 16 and game characters (for example, game characters 20*b* and 20*c*) corresponding to other game devices 16 are displayed. The game character corresponding to the game device 16 is, for example, a game character to be controlled by the user who uses the game device 16. In other words, the game character corresponding to the game device 16 is the game character controlled by the controller of the game device 16.

In addition, balloon images 22*a*, 22*b*, and 22*c* are displayed on the game screen. The balloon image 22*a* is a balloon image corresponding to the game character 20*a*. Similarly, the balloon image 22*b* is a balloon image corresponding to the game character 20*b* and the balloon image 22*c* is a balloon image corresponding to the game character 20*c*. A display position of the balloon image is determined based on a display position of the game character corresponding to the balloon image. A message string which is input by the user is displayed in the balloon of the balloon image. In other words, when a message string is input by a game device 16, the message string is displayed in the balloon, of the balloon image corresponding to the game device 16, on the game device 16 and/or other game devices 16.

In the network game system 10 having such a structure, users can chat and communicate with each other. In particular, in the network game system 10, each user can make a contract with one or a plurality of advertisers, and points are provided to users who use a specific string (for example, name of goods, name of service, keyword, or catch phrase, etc.) designated by the contracted advertiser in the chat. In this manner, the network game system 10 is configured to promote advertisement through word-of-mouth communication.

Figures 3, 4, 5:
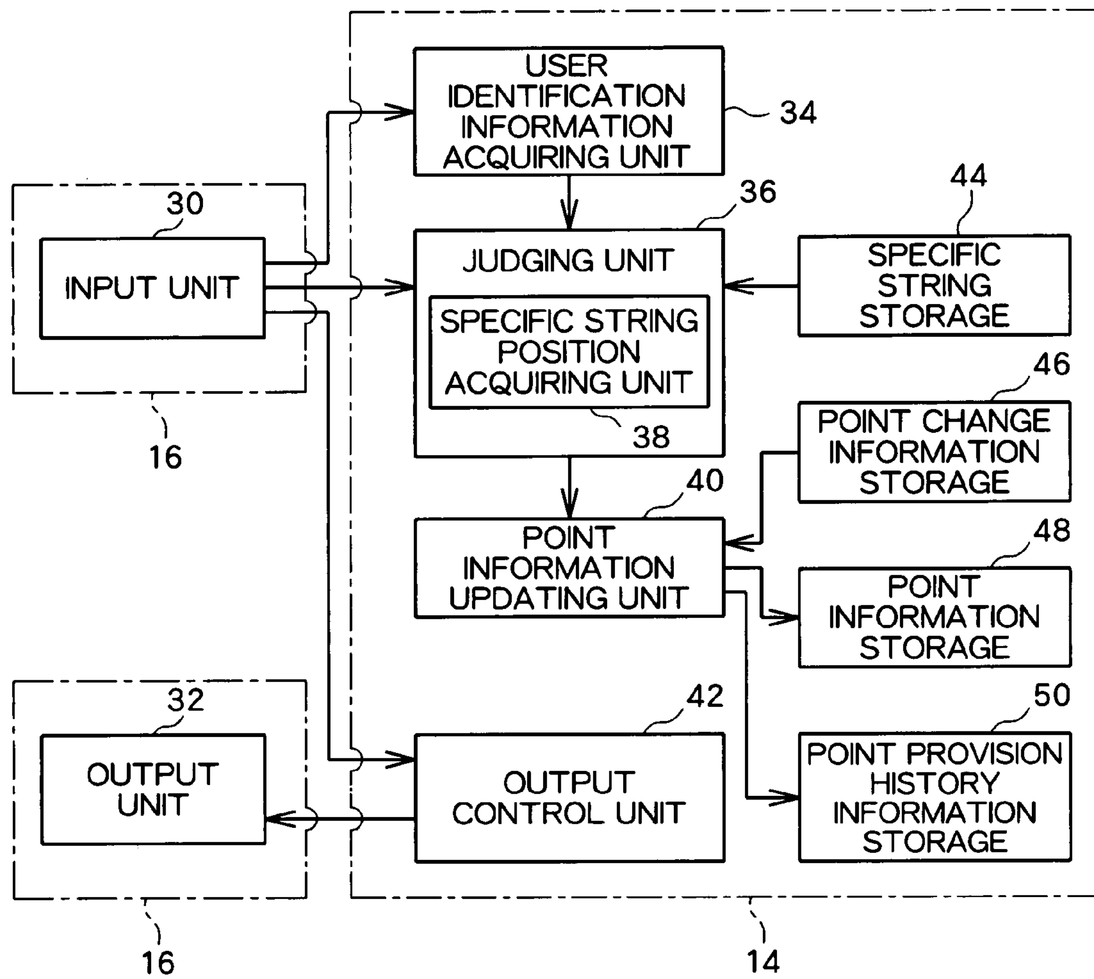
FIG. 3 is a functional block diagram of the network game system according to the embodiment of the present invention.
FIG. 4 is a diagram showing an example of a point amount outstanding table.
FIG. 5 is a diagram showing an example of specific string table.

A functional structure of the network game system 10 will now be described. FIG. 3 primarily shows functional blocks, among the functional blocks realized in the network game system 10, related to the present invention. These functions are realized by a program supplied through information storage media such as CD-ROMs, DVD-ROMs or the like and through the communication network 12 being executed by the game server 14 and the game device 16.

As shown in FIG. 3, the network game system 10 comprises an input unit 30, an output unit 32, a user identification information acquiring unit 34, a judging unit 36, a point information updating unit 40, an output control unit 42, a specific string storage 44, a point change information storage 46, a point information storage 48, and a point provision history information storage 50. In the following description, a configuration is exemplified in which the input unit 30 and the output unit 32 are provided in each game device 16 and the other functional blocks are provided in the game server 14, but each of the functional blocks may be provided in either one of the game server 14 and the game device 16. For example, the user identification information acquiring unit 34, the judging unit 36, and the specific string storage 44 may be provided in the game device 16. In this case, the judging unit 36 may be configured to transmit a judgment result to the game server 14 through the communication network 12. The judging unit 36 may transmit the judgment result each time the judging unit 36 judges (that is, each time a message string is input). Alternatively, the judging unit 36 may be configured to store a history of judgment results and transmit the history at a predetermined timing (for example, at a timing of completion of the chat).

[1. Point Information Storage]

The point information storage 48 is realized with a known hard disk storage device and a database management system. The point information storage 48 stores point information in correspondence with user identification information. The user identification information is information which directly or indirectly identifies a user. The user identification information may be, for example, information which identifies the game device 16. The point information is numerical information or the like showing amount outstanding of points (including others which are referred to by names such as “coins” and “medals”). The points may be used as a currency in the game or may be exchangeable with goods and services in the real world.

In the present embodiment, a point amount outstanding table of FIG. 4, for example, is stored in the point information storage 48. The point amount outstanding table of FIG. 4 includes a user ID field and a point amount outstanding field. The user ID field stores a user ID. The user ID is information which uniquely identifies a user. The point amount outstanding field stores information showing an amount of points owned by the user.

[2. Specific String Storage and Point Change Information Storage]

The specific string storage 44 and the point change information storage 46 are realized with a known hard disk storage device and a database management system. The specific string storage 44 stores one or a plurality of specific strings in correspondence with the user identification information. The point change information storage 46 stores point change information in correspondence with each specific string.

In the present embodiment, a specific string table shown in FIG. 5, for example, is stored in the specific string storage 44 and the point change information storage 46. The specific string table of FIG. 5 has a specific string ID field, a specific string field, and a base point amount field. The specific string ID field stores a specific string ID. The specific string ID is information which uniquely identifies a specific string. The specific string field stores a specific string. The specific string is a specific string formed including one or a plurality of characters. The character includes, for example, Japanese Hiragana characters, Japanese Katakana characters, Kanji or Chinese characters, numbers, alphabetic characters, symbols, etc. The specific string is a string related to, for example, goods and services. More specifically, the specific string may be a name of goods, a name of a service, a keyword, a catch phrase, etc.

The base point amount field stores numerical information (point change information) forming a basis for determining an amount of points to be provided to a user who has input the specific string. The numerical value (base point amount) stored in the base point amount field may be determined, for example, based on a number of characters (length) of the specific string. For example, because a specific string with a larger number of characters requires a larger amount of work for input, the base point amount for such a specific string may be increased so that more points are provided to the user. Alternatively, the base point amount may be determined based on the type of character included in the specific string. For example, because a specific string which includes a larger number of character types such as the Japanese Hiragana characters, Chinese characters, numbers, alphabetic characters, and symbols requires a larger amount of work for input, the base point amount for such a specific string may be increased so that a larger number of points are provided to the user.

The specific string storage 44 also stores a table of correspondence between a user and a specific string. For example, the specific string storage 44 stores a user specific string table as shown in FIG. 6. The user specific string table of FIG. 6 includes a user ID field and a specific string ID field. The user ID field stores a user ID. The specific string ID field stores a specific string ID (or specific string IDs) of one or a plurality of specific strings correlated to the user. More specifically, the specific string ID of the specific string designated by the advertiser with whom the user has made contract is stored.

[3. Input Unit]

The input unit 30 is a unit for inputting a message string. The input unit 30 is realized, for example, with a keyboard. Alternatively, the input unit 30 may be realized with a microphone and software which converts a voice which is input through the microphone into a string (text). Alternatively, it is also possible to employ a configuration in which the message string can be input by sequentially designating characters from characters displayed on a display, using a display position designating unit such as a mouse, a game controller or the like.

The message string which is input by the input unit 30 is a string comprising one or a plurality of characters. The characters include, in addition to the characters such as the Japanese Hiragana characters, Japanese Katakana characters, Chinese characters, numbers, alphabetic characters, and symbols, a control character (for example, line feed or tab) for controlling the display and printer. The message string which is input by the input unit 30 may include a plurality of sentences. In addition, the message string which is input by the input unit 30 is transmitted to the game server 14 through the communication network 12. In the present embodiment, a user ID of the user who has input the message string is transmitted along with the message string.

[4. User Identification Information Acquiring Unit]

The user identification information acquiring unit 34 acquires user identification information corresponding to the message string which is input from the input unit 30. In other words, the user identification information acquiring unit 34 acquires user identification information of a user who has input the message string. In the present embodiment, the user ID which is received along with the message string is acquired by the user identification information acquiring unit 34.

[5. Judging Unit]

The judging unit 36 judges whether or not the message string which is input by the input unit 30 contains a specific string stored in the specific string storage 44. In the present embodiment, the judging unit 36 judges whether or not the message string which is input by the input unit 30 contains a specific string stored in the specific string storage 44 in correspondence with user identification information acquired by the user identification information acquiring unit 34. In the present embodiment, the judgment by the judging unit 36 is executed based on the specific string table and the user specific string table. This process will be described later in more detail (refer to FIG. 10).

The judging unit 36 includes a specific string position acquiring unit 38. The specific string position acquiring unit 38 acquires a position of the specific string in the message string when the judging unit 36 judges that the message string which is input by the input unit 30 contains the specific string stored in the specific string storage 44. In the present embodiment, it is judged as to which position in the sequence of the message string the first character of the specific string corresponds.

[6. Point Information Updating Unit]

The point information updating unit 40 updates the point information stored in the point information storage 48 in correspondence with the user identification information acquired by the user identification information acquiring unit 34, based on a judgment result by the judging unit 36. For example, when it is judged that the message string which is input by the input unit 30 contains the specific string stored in the specific string storage 44, the point information updating unit 40 executes the updating process based on the point change information stored in the point change information storage 46 in correspondence with the specific string. Alternatively, for example, the point information updating unit 40 may execute the updating process based on an acquisition result by the specific string position acquiring unit 38.

The point information updating unit 40 in the present embodiment stores, for example, a point provision coefficient table as shown in FIG. 7. The point provision coefficient table of FIG. 7 includes a position field and a point provision coefficient field. The position field stores information indicating a position, in the message string, of a first character of the specific string. The point provision coefficient field stores numerical information indicating the point provision coefficient. The point provision coefficient is numerical information which forms a basis for determining an amount of points to be provided to the user. This information is provided such that, for example, more points are provided to the user the closer the position of the specific string in the message string is to the head of the message string.

The point information updating unit 40 of the present embodiment provides, when it is judged that the message string contains the specific string, points to the user who has input the message string. Specifically, the point information updating unit 40 increases the value of the point amount outstanding field of the point information table corresponding to the user ID acquired by the user identification information acquiring unit 34. The amount of increase is determined based on the base point amount field of the specific string table and the point provision coefficient field of the point provision coefficient table. Details of this process will be described later (refer to FIG. 10).

[7. Point Provision History Information Storage]

The point provision history information storage 50 is realized with a known hard disk storage device and a database management system. The point provision history information storage 50 stores point provision history information. In the present embodiment, a point provision history table as shown in FIG. 8, for example, is stored in the point provision history information storage 50. The point provision history table of FIG. 8 includes a date field, a user ID field, a specific string ID field, and a provided point amount field. The date field stores information indicating the date and time when the point is provided to the user. The user ID field stores user ID of the user to which the point is provided. The specific string ID field stores a specific string ID of a specific string which is input by the user. The provided point amount field stores information indicating an amount of points provided to the user.

A summarized result of the point provision history table may be output. For example, a total of the amount of provided points for each specific string may be calculated and provided to the advertiser. Advertisement billing may be executed based on the summarized result. Alternatively, for example, a total of the amount of provided points for each combination of a user and a specific string may be calculated and provided to the user and the advertiser. With this configuration, it is possible to allow, for example, awarding of a special offer or the like by the advertiser to the user obtaining a large amount of points.

[8. Output Control Unit]

The output control unit 42 causes a message string which is input by the input unit 30 to be output on the output unit 32 of at least one game device 16. For example, the output control unit 42 causes a message string which is input by a certain game device 16 to be displayed on an output unit 32 of at least one other game device 16.

The output control unit 42 of the present embodiment stores, for example, a message string table of FIG. 9. The message string table of FIG. 9 includes a user ID field and a message string field. The user ID field stores the user ID. The message string field stores the message string which is input by the user. The output control unit 42 distributes game data indicating the contents of the message string table to the game devices 16.

[9. Output Unit]

The output unit 32 is realized with, for example, a display unit such as a display and a voice output unit such as a speaker, and outputs the message string which is input by the input unit 30. The output unit 32 of the present embodiment displays, for example, a game screen as shown in FIG. 2 based on the game data transmitted from the game server 14.

Figure 10:
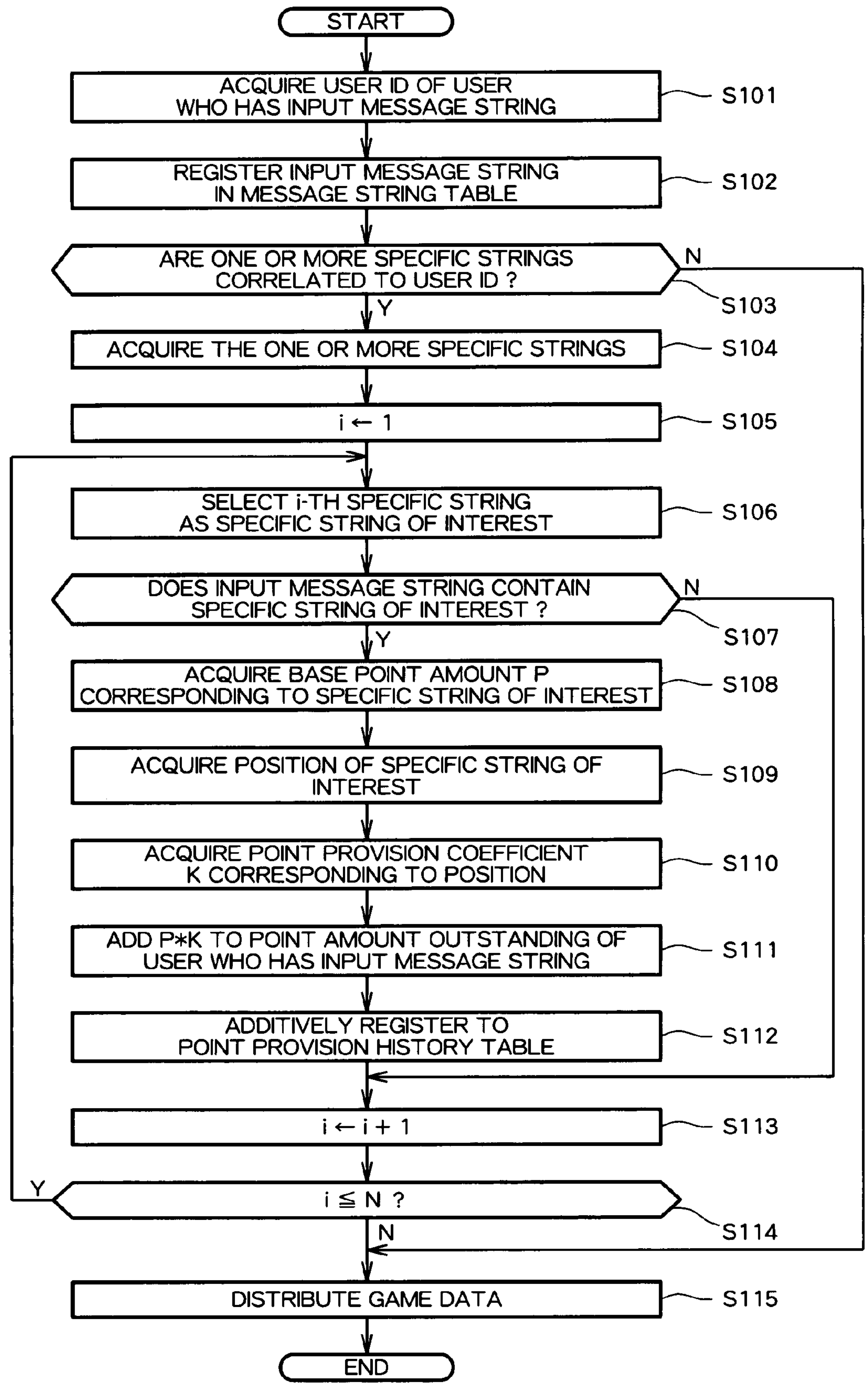
FIG. 10 is a flowchart showing a process executed at a game server.

Next, a process executed by the game server 14 when a message string is input will be described. FIG. 10 shows a flowchart of this process.

As shown in FIG. 10, in this process, first, the user identification information acquiring unit 34 acquires a user ID of a user who has input the message string (S101). In addition, the output control unit 42 stores the input message string in the message string field of the message string table corresponding to the acquired user ID (S102). The judging unit 36 then judges whether or not one or more specific strings are correlated with the acquired user ID (S103).

When the judging unit 36 judges that one or more specific strings are correlated, the judging unit 36 acquires the one or more specific strings (S104). The judging unit 36 then initializes a variable i to 1 (S105).

Then, the judging unit 36 selects, as a specific string of interest, an i-th specific string of the one or more specific strings acquired in S104 (S106). The judging unit 36 judges whether or not the input message string contains the specific string of interest (S107).

When the judging unit 36 judges that the message string contains the specific string of interest, the point information updating unit 40 acquires a base point amount P corresponding to the specific string ID of the specific string of interest based on the base point amount field of the specific string table (S108). The specific string position acquiring unit 38 acquires a position, in the message string, of a first character of the specific string of interest (S109). The point information updating unit 40 acquires a point provision coefficient K corresponding to the position based on the point provision coefficient table (S110).

The point information updating unit 40 then adds an amount of points obtained by multiplying the base point amount P and the point provision coefficient K to the value of the point amount outstanding field of the point information table corresponding to the user ID acquired in S101 (S111). The point information updating unit 40 then adds a record to the point provision history table (S112). In this case, information indicating the date and time at this time is stored in the date field of the record to be newly added. The user ID acquired in S101 is stored in the user ID field. The specific string ID of the specific string of interest is stored in the specific string ID field. A value obtained by multiplying the base point amount P and the point provision coefficient K is stored in the provided point amount field.

The judging unit 36 then increments the variable i (S113), and judges whether or not the variable i is less than or equal to N (S114). The number N indicates a number of specific strings acquired in S104. When the judging unit 36 judges that the variable i is less than or equal to N, the processes of S106-S114 are again executed.

When, on the other hand, the judging unit 36 judges that the variable i is greater than N or when the judging unit 36 judges in S103 that no specific string is correlated, the output control unit 42 generates game data based on the contents of the message string table and distributes the game data to the game devices 16 (S115).

The above-described processes are realized by a program, which is supplied through an information storage medium such as a CD-ROM etc. or the communication network 12, being executed by the game server 14.

As described, in the network game system 10, when a user inputs a message string containing a specific string, points are provided to the user. Because of this, with the network game system 10, it is possible to increase input motivation of a user with respect to the message string including the specific string. As a result, by setting a keyword or the like related to advertisement as the specific string, it is possible to promote active advertisement through word-of-mouth communication.

The present invention is not limited to the preferred embodiment described above.

For example, it is also possible to employ a configuration in which a table, in which a position of the specific string in the message string and the amount of points are correlated, is stored in place of the point provision coefficient table of FIG. 7. In this case, the point information updating unit 40 may be configured to acquire a point amount P' corresponding to an acquisition result by the specific string position acquiring unit 38 in S110 of FIG. 10. In S111, an amount of points in which the point amount P' is added to the base point amount P is added to the point amount outstanding of the user.

In the above-described embodiment, when the message string which is input by the user contains the specific string, points of an amount corresponding to the specific string are provided to the user. Alternatively, it is also possible to employ a configuration in which the point amount outstanding of the user is decreased by an amount corresponding to a specific string, depending on the specific string.

Alternatively, it is also possible to employ a configuration in which points are provided when a user uses a specific string designated by an advertiser in the chat, regardless of the presence of a contract. In this case, the user specific string table does not need to be provided, and the judging unit 36 may judge, for all of the specific strings stored in the specific string table, whether or not the message string contains the specific string.

Alternatively, it is also possible to not provide the game server 14. In this case, the functional block described above as being provided in the game server 14 may be provided in each game device 16.

The application of the present invention is not limited to a network game system, and the present invention may be applied to other message output systems.

The invention claimed is:

1. A message string output system, comprising:

a plurality of user terminal devices, wherein at least one of the plurality of user terminal devices is configured to output a message string, which is input by a user of said at least one of the plurality of user terminal devices during a game, to at least one other user terminal device among the plurality of user terminal devices; and a game server in communication with the plurality of user terminal devices, the game server configured to:

store point information in correspondence with user identification information;

store a specific string indicative of an advertisement;

acquire user identification information corresponding to a message string which is input by said at least one of the plurality of user terminal devices;

receive, from the at least one of the plurality of user terminal devices that is associated with the acquired user identification information, the specific string during the game that is inserted within the message string during the game;

judge whether the message string which is input by said at least one of the plurality of user terminal devices contains the stored specific string; and update, based on a judgment result by the judging, the stored point information in correspondence with the acquired user identification information.

2. The message string output system according to claim 1, wherein the game server is configured to store one or a plurality of specific strings in correspondence with the user identification information, and to judge whether the message string, which is input by the at least one of the plurality of user terminal devices, contains the stored specific string in correspondence with the acquired user identification information.

3. The message string output system according to claim 1, the game server further configured to:

store point change information in correspondence with the specific string, and update, when it is judged that the message string, which is input by the at least one of the plurality of user terminal devices, contains the stored specific string, the stored point information in correspondence with the acquired user identification information, based on the stored point change information.

4. The message string output system according to claim 3, wherein the gamer server is further configured to determine the point change information based on a number of characters of the specific string.

5. The message string output system according to claim 3, wherein the point change information is determined based on types of characters included in the specific string.

6. The message string output system according to claim 1, wherein the game server is configured to:

acquire, when it is judged that the message string which is input by the at least one of the plurality of user terminal devices contains the stored specific string, a position of the specific string in the message string, and update the stored point information in correspondence with the acquired user identification information, based on the acquired position of the specific string in the message string.

7. The message string output system according to claim 1, wherein the system is operative to execute game software and the user terminal devices comprise game controllers as a user input unit.

8. The message string output system according to claim 1, wherein at least one specific string comprises advertising.

9. A method of controlling a message string output system comprising:

outputting a message string by at least one of a plurality of user terminal, is the message being input by a user of said at least one of the plurality of user terminal devices during a game, to at least one other user terminal device among the plurality of user terminal devices;

storing point information in correspondence with user identification information, and a specific string indicative of an advertisement;

acquiring by a game server in communication with the plurality of user elements, user identification information corresponding to a message string, which is input by said at least one of the plurality of user terminal devices, receiving, from the at least one of the plurality of user terminal devices that is associated with the acquired user identification information, the specific string during the game that is inserted within the message string during the game;

judging by the game server, whether the message string, which is input by said at least one of the plurality of user terminal devices, contains the stored specific string; and updating by the game server, the stored point information, which is stored in correspondence with the acquired user identification information, wherein the updating is based on a judgment result in the judging step.

10. A non-transitory computer readable medium for causing a computer to function as a message string output system which comprises a plurality of user terminal devices, at least one of the plurality of user terminal devices is configured to output a message string which is input during a game by a user of said at least one of the plurality of user terminal devices to at least one other user terminal device among the plurality of user terminal devices, the non-transitory computer readable medium including executable instructions, and perform the following functions:

storing point information in correspondence with user identification information;

storing a specific string;

acquiring user identification information corresponding to a message string which is input by said at least one of the plurality of user terminal devices, receiving, from the at least one of the plurality of user terminal devices that is associated with the acquired user identification information, the specific string during the game that is inserted within the message string during the game;

judging whether the message string, which is input by said at least one of the plurality of user terminal devices, contains the stored specific string; and updating, based on a judgment result by the judging, the stored point information in correspondence with the acquired user identification information.

* * * * *